United States Patent
Maucher et al.

(10) Patent No.: US 7,507,160 B2
(45) Date of Patent: Mar. 24, 2009

(54) COUNTER TRACK JOINT WITH A BALL CAGE

(75) Inventors: Stephan Maucher, Siegburg (DE); Ida Hassenrik, Troisdorf (DE); Thomas Weckerling, Bonn (DE)

(73) Assignee: GKN Driveline International GmbH, Lohmar (DE)

( * ) Notice: Subject to any disclaimer, the term of this patent is extended or adjusted under 35 U.S.C. 154(b) by 158 days.

(21) Appl. No.: 10/563,183

(22) PCT Filed: Jun. 21, 2004

(86) PCT No.: PCT/EP2004/006681

§ 371 (c)(1),
(2), (4) Date: Apr. 11, 2006

(87) PCT Pub. No.: WO2005/026568

PCT Pub. Date: Mar. 24, 2005

(65) Prior Publication Data

US 2007/0111807 A1    May 17, 2007

(30) Foreign Application Priority Data

Aug. 18, 2003 (DE) ................... 103 37 919

(51) Int. Cl.
*F16D 3/224* (2006.01)
(52) U.S. Cl. ............... 464/145; 464/906; 29/898.067
(58) Field of Classification Search ............ 464/15, 464/140–146, 906; 29/898.064–898.067
See application file for complete search history.

(56) References Cited

U.S. PATENT DOCUMENTS

| 5,509,856 A | 4/1996 | Welschof |
| 6,368,223 B1* | 4/2002 | Ouchi et al. ............ 464/145 |
| 2002/0128079 A1* | 9/2002 | Hildebrandt et al. ...... 464/145 |

FOREIGN PATENT DOCUMENTS

| DE | 1 202 588 | 10/1965 |
| EP | 0 802 341 A1 | 10/1997 |
| JP | 11 236 926 | 8/1999 |
| WO | WO 02/46631 A1 | 6/2002 |

\* cited by examiner

*Primary Examiner*—Greg Binda
(74) *Attorney, Agent, or Firm*—Rader, Fishman & Grauer PLLC.

(57) ABSTRACT

A constant velocity joint in the form of a counter-track joint. The circumferential length (L1) of the first cage windows for the balls in the first pairs of tracks is greater than the circumferential length (L2) of the second cage windows for the balls in the second pairs of tracks. This permits a method of assembly wherein first the first balls, one after the other, are mounted in first pairs of tracks which widen from the aperture end to the attaching end and wherein then the second balls, one after the other, are mounted in second pairs of tracks which widen from the attaching end to the aperture end. For mounting the second balls in the second pairs of tracks, only a small over-articulation angle is necessary, and thus a shorter circumferential length of the respective windows than there is required for mounting the first balls in the first pairs of tracks.

20 Claims, 5 Drawing Sheets

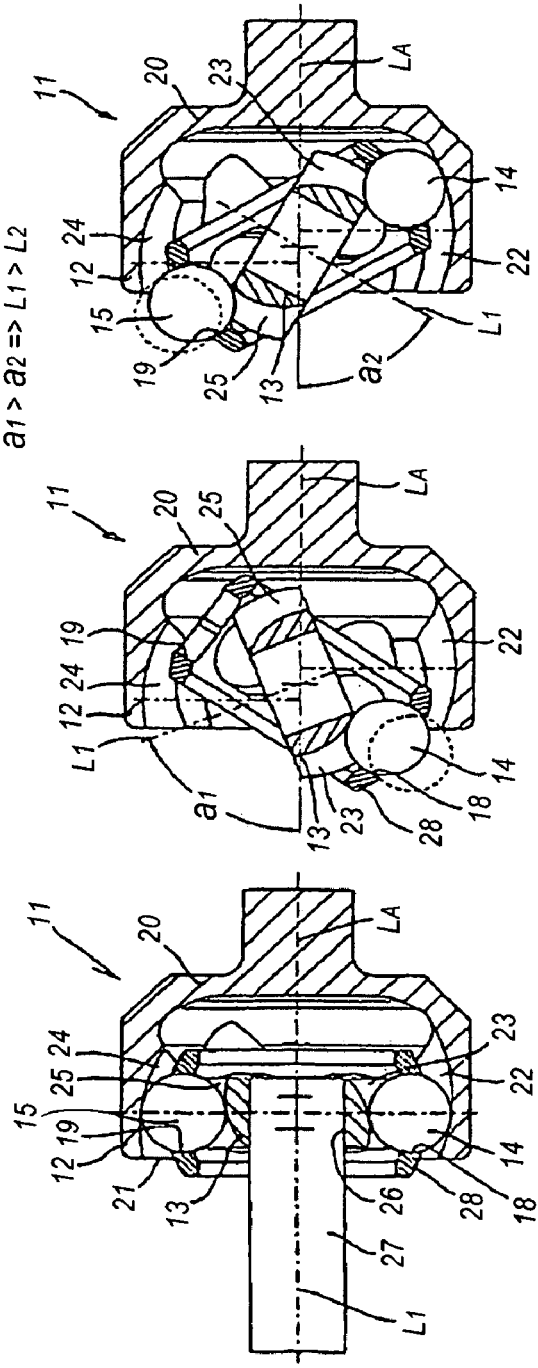
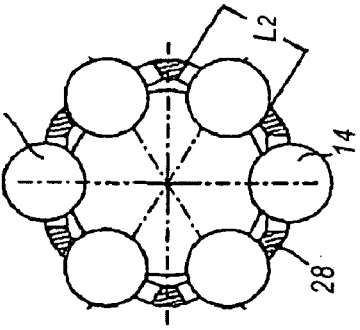

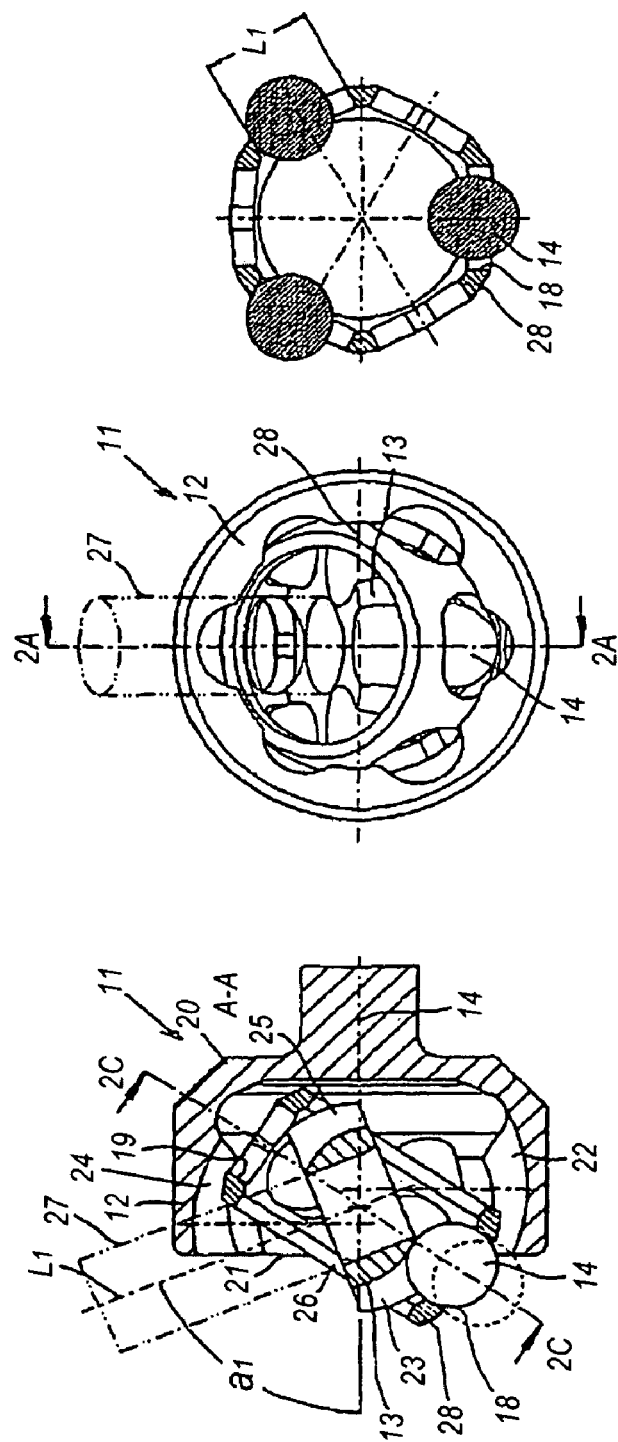

COUNTER TRACK JOINT WITH A BALL CAGE

TECHNICAL FIELD

The invention relates to a constant velocity joint in the form of a counter-track joint.

BACKGROUND

Such joints have the following characteristics: an outer joint part which comprises a first longitudinal axis $L_A$ as well as an attaching end and an aperture end which are positioned axially opposite one another, and which comprises first outer ball tracks and second outer ball tracks; an inner joint part which comprises a second longitudinal axis $L_I$ and attaching means for a shaft pointing towards the aperture and of the outer joint part, and which comprises first inner ball tracks and second inner ball tracks; the first outer ball tracks and the first inner ball tracks form first pairs of tracks which receive first balls; the second outer ball tracks and the second inner ball tracks form second pairs of tracks which receive second balls; and a ball cage positioned between the outer joint part and the inner joint part and comprising circumferentially distributed first cage windows each accommodating one of the first balls and circumferentially distributed second cage windows each accommodating one of the second balls.

When assembling fixed joints it is common practice first to insert the outer joint part, the ball cage and the inner joint part into one another and then to insert the balls while over-articulating the joint, i.e. articulating the inner joint part and outer joint part relative to one another to such an extent that cage windows of the cage, with the cage guided on to half the articulation angle between the inner joint part and outer joint part, emerge from the outer joint part. When over-articulating the joint, any balls which have already been mounted and which are not positioned in the articulation plane and not in a plane extending through the axis of the ball cage perpendicularly to the articulation plane are displaced in the circumferential direction in their cage windows. The greater the articulation angle, the greater the circumferential length of the respective cage windows has to be. By increasing the length of the cage windows, the width of the webs between the cage windows is reduced. This results in a reduction in the strength of the cage, which is undesirable.

In connection with a constant velocity fixed joint whose pairs of tracks jointly widen towards the aperture, it is already known from U.S. Pat. No. 5,509,856 to propose a cage which comprises cage windows which are positioned opposite one another in a radial plane, which have a first shorter circumferential length as well as having cage windows whose centers are positioned outside said radial plane and outside a plane arranged perpendicularly thereto, having a second greater circumferential length.

SUMMARY OF THE INVENTION

The present invention provides improved constant velocity joints wherein more particularly the cage comprises an increased strength. Specifically, the circumferential length L1 of the first cage windows for the balls in the first pairs of tracks is greater than the circumferential length L2 of the second cage windows for the balls in the second pairs of tracks. This permits a method of assembly wherein first the first balls, one after the other, are mounted in first pairs of tracks which widen from the aperture end to the attaching end and wherein then the second balls, one after the other, are mounted in second pairs of tracks which widen from the attaching end to the aperture end. For mounting said second balls in the second pairs of tracks, there is required a smaller over-articulation angle and thus also a shorter circumferential length of the respective windows than there is required for mounting the first balls in the first pairs of tracks.

According to a first embodiment, the first pairs of tracks and second pairs of tracks are arranged so as to alternate across the circumference. Alternatively, it is possible for pairs of first pairs of tracks and pairs of second pairs of tracks to be arranged so as to alternate in the circumferential direction.

At the attaching end, the outer joint part can comprise a joint base with an attaching journal or a flange face with a further second aperture arranged opposite the first aperture.

The advantages of the invention are particularly obvious in joints with a large number of balls, i.e. comprising eight or ten balls, wherein the web width is particularly reduced. However, the invention is equally suitable for counter track joints with an even number of at least four balls. For arranging the first pairs of tracks and the second pairs of tracks in joints with different numbers of balls, reference is made to the following description of the drawings.

BRIEF DESCRIPTION OF THE DRAWINGS

Preferred embodiments of the invention are illustrated in the drawings and will be described below.

FIG. 1 shows a first embodiment of an inventive counter track joint;
 A) in a longitudinal section;
 B) in a longitudinal section during a first assembly phase;
 C) in a cross-section through the ball cage during the first assembly phase;
 D) in a longitudinal section during a second assembly phase; and
 E) in a cross-section through the ball cage during the second assembly phase.

FIG. 2 shows an inventive joint in the first assembly phase according to FIGS. 1B and 1C;
 A) in a longitudinal section;
 B) in an axial view of the joint aperture; and
 C) in a cross-section through the ball cage.

DETAILED DESCRIPTION

Figure 3C:
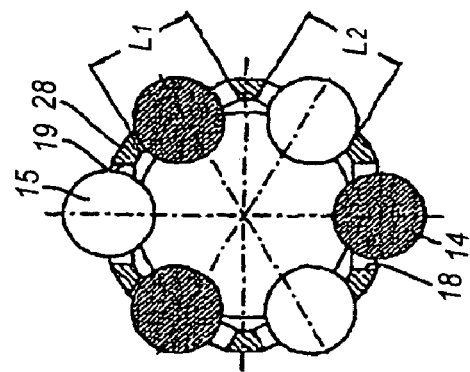
FIG. 3 shows an inventive joint in a second assembly phase according to FIGS. 1D and 1E;
 A) in a longitudinal section;
 B) in an axial view of the joint aperture; and
 C) in a cross-section through the ball cage.

The following descriptions of the individual illustrations of FIG. 1 partly overlap.

FIG. 1A shows an inventive counter track joint 11 showing an outer joint part 12 with a base 20 and a joint aperture 21, as well as an inner joint part 13 with an inner aperture 26 and a shaft 27 inserted into the latter. In the longitudinal section through the joint, it is possible to identify one of the first balls 14 and one of the second balls 15. The first balls 14 run in pairs of first outer tracks 22 and first inner tracks 23 which widen from the aperture to the base, and the balls 15 run in pairs of second outer tracks 24 and second inner tracks 25 which widen from the base 20 to the aperture 21. The balls are held by a ball cage 28 in a common plane, and there are provided first windows 18 for the first balls 14 and second windows 19 for the second balls 15. For the purpose of assembling the joint, the inner joint part 13, the ball cage 28 and the outer joint part 12 are inserted into one another in a way generally known in itself, wherein optionally, the longitudinal axes of the respective outer part and of the respective inner part have to be arranged in a position where they intersect one another, and the inner part, while being moved around its own longitudinal axis, is rolled into the outer part. Only then is the respective inner part again aligned coaxially relative to the outer part. Thereafter, the outer joint part 12, the ball cage 28 and the inner joint part 13 are inserted into one another, but the balls are not yet mounted. FIGS. 1B and 1C show the first balls 14 being introduced into the first pairs of tracks. The inner joint part 13 with its longitudinal axis $L_I$ is articulated by an angle $a_1$ relative to the outer joint part 12 with its longitudinal axis $L_A$, with the ball cage 29 with its longitudinal axis $L_K$ and its central plane respectively assuming an angle-bisecting position relative to the angle $a_1$. The cage 28 and the joint parts 12, 13 are disposed in such a way that one of the first cage windows 18 is positioned centrally in the articulation plane and emerges from the outer joint part 12. In this position, which is also referred to as "over-articulation" of the joint, as it is not assumed in operation, a first ball 14 is inserted from the outside into said first cage window 18, whereupon the inner joint part 13 and the cage 28 are pivoted back, with the same process being repeated twice in other articulation planes, each turbed by 120° for the purpose of inserting the further first balls 14. When inserting the last one of the balls 14 as shown in FIGS. 1B and 1C, the two other first balls—because of the way in which the track extends—assume a changed circumferential position in their cage windows 18 because of the track extension of the associated pairs of tracks 22, 23 positioned outside the articulation plane. To be able to permit said circumferential movement of the balls during assembly under "over-articulation" conditions, the first cage windows 18 have to have a circumferential length $L_1$.

FIGS. 1D and 1E show the assembly of one of the second balls 15, more particularly of the last one of the second balls into one of the second pairs of tracks 24, 25. The inner joint part 13 with its longitudinal axis $L_I$ is articulated by the angle $a_2$, which is smaller than the previously mentioned angle $a_1$, relative to the outer joint part 12 with its longitudinal axis $L_A$. The cage 28 with its longitudinal axis $L_K$ and its central plane respectively assumes the angle-bisecting position with reference to said angle $a_2$. In this case, too, because of the position of the further two pairs of tracks 24, 25 of the further two balls 15, which position is located outside the articulation plane, it is necessary for the further two balls in their cage windows 19 to be displaced in the circumferential direction. In order to permit said circumferential displacement of the balls during assembly, i.e. during "over-articulation", the two cage windows 19 in their circumferential direction have to have the length $L_2$ which, however, is smaller than the length $L_1$ of the first cage windows.

FIG. 2 shows the inventive joint according to FIG. 1 in the position according to FIGS. 1B and 1C during the assembly of the last one of the first balls 14. The shaft 27 which is inserted into the inner aperture 26 of the inner joint part 13 is shown in dashed lines. This illustration shows that when the shaft has been inserted, i.e. when the joint is in operation, "over-articulation" as shown here is no longer possible for mounting the balls because, long before reaching the articulation angle $a_1$, the shaft 27 would collide with the edge of the outer joint part 12. FIG. 2B shows how the lower first cage window 18 has largely emerged from the outer joint part 12 for introducing the first ball 14 into the first inner track 23. FIG. 2C once again shows the position of the two other first balls 14 which are positioned outside the articulation plane, with the joint being "over-articulated" by the angle $a_1$ for the purpose of introducing the last one of the first balls 14.

Figure 3B:
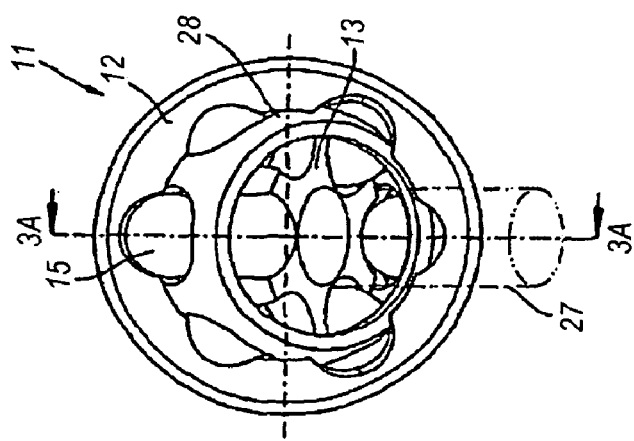
Figure 3A:
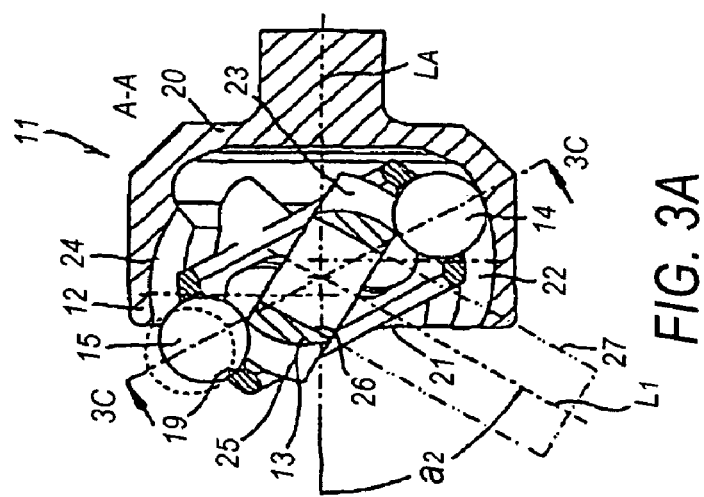

FIG. 3 shows the inventive joint according to FIG. 1 in the position according to FIGS. 1B and 1C during the assembly of the last one of the second balls 15. The shaft 27 which has been inserted into the inner aperture 26 of the inner joint part 13 is illustrated in dashed lines. These illustrations show that, when the shaft has been inserted, i.e. when the joint is ready for operation, "over-articulation" as shown here is no longer possible for mounting the balls because, long before reaching the articulation angle $a_2$, the shaft 27 would collide with the edge of the outer joint part 12. FIG 3B shows how the lower first cage window 19 has largely emerged from the outer joint part 12 for introducing the second ball 15 into the second inner track 25. FIG. 3C once again shows the position of the two other second balls 15 which are positioned outside the articulation plane, with the joint being "over-articulated" by the angle $a_2$ for the purpose of introducing the last one of the second balls 15.

Figure 4C:
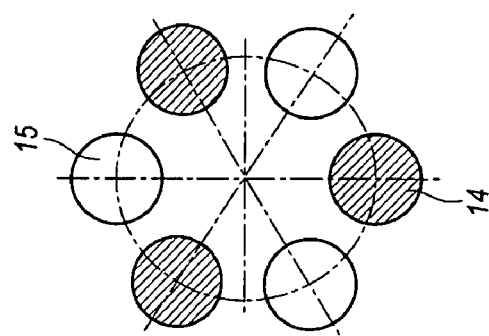
FIG. 4 shows an inventive joint in a modified embodiment in the form of a disc joint:
 A) in a longitudinal section;
 B) in an axial view of the driving journal; and
 C) in a cross-section through the ball configuration.
Figure 4B:
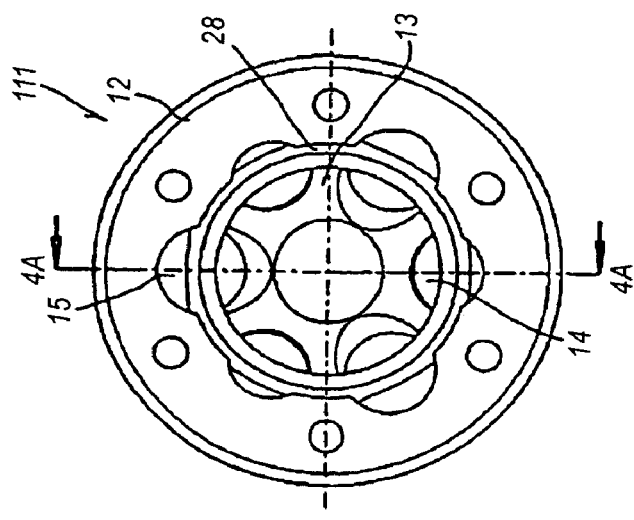
Figure 4A:
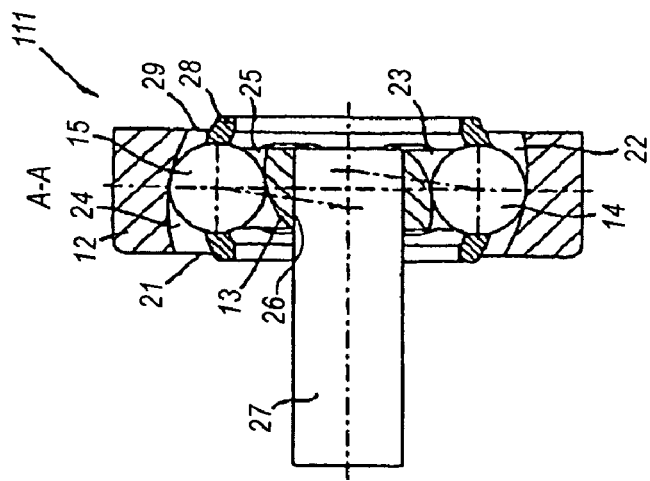

FIG. 4 shows an inventive counter track joint in a modified embodiment where the joint 111 is provided in the form of a so-called disc joint which, instead of a base 20 comprises a further aperture 29 opposite the first aperture 21. In this case, too, the joint illustrated comprises three first balls 14 in first cage windows 18 and three second balls 15 in second cage windows. The first balls 14 are mounted before the second balls 15 are mounted; if there is a case of symmetry between the outer joint part and the inner joint part, assembly can also take place from the second end of the joint. In this case, too, it is necessary for the first windows 18 for the first balls 14 in the first pairs of tracks 22, 23 to have a greater length L1 in the circumferential direction than the cage windows 19 for the second balls 15 in the second pairs of tracks 24, 25.

The reason why the balls, upon articulation of the joint, are displaced in the circumferential direction relative to the center of the respective cage window is that the balls move along their tracks when the joint is articulated. Said ball tracks are positioned in radial planes relative to the respective joint component. In consequence, when the joint is articulated, the central plane of the ball cage no longer coincides with the central planes of the inner joint part and outer joint part, but forms inclined sections through said joint components. In said inclined sections, the circumferential distance between the tracks is distorted and thus non-uniform, and the circumferential distance between the balls and thus the position of the balls in the cage windows arranged on a uniform pitch circle in the cage is correspondingly non-uniform.

FIG. 5 shows the ball configurations of inventive joints with different numbers of balls, with first balls 14 which are positioned in first pairs of tracks 22, 23 widening in a first direction being hatched and second balls 15 which are positioned in second pairs of tracks 24, 25 widening in the opposite direction being illustrated by circumferential lines only.

Figure 5E:
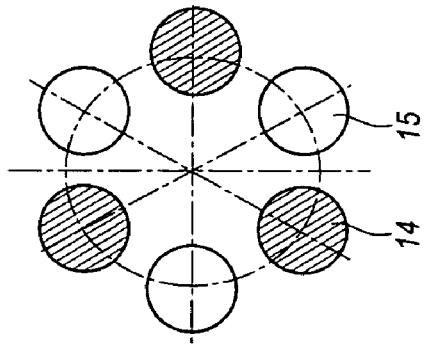
FIG. 5 shows different ball configurations of inventive joints;
 A) with ten balls;
 B) with eight balls;
 C) with eight balls
 D) with six balls; and
 E) with four balls.
Figure 5D:
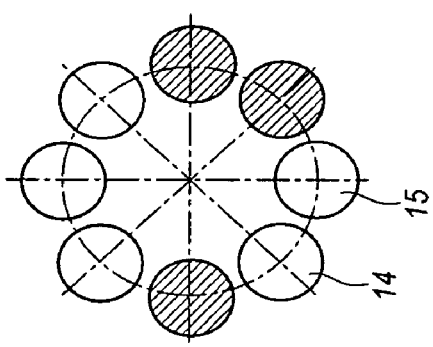
Figure 5B:
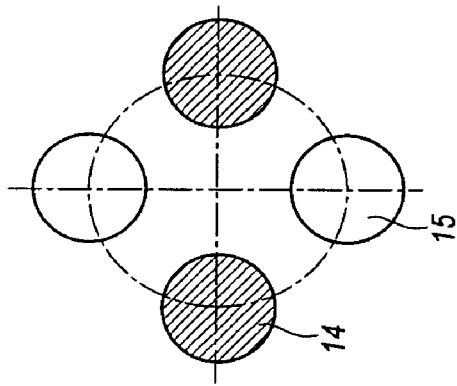
Figure 5C:
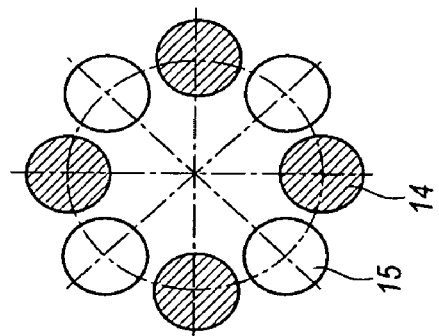
Figure 5A:
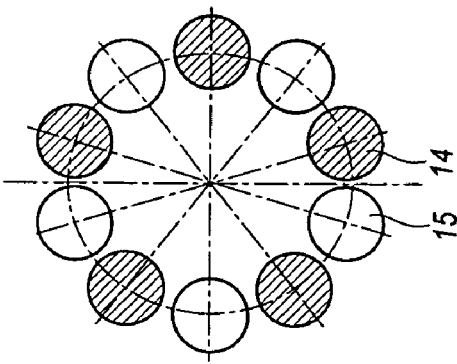

FIG. 5A shows the balls of a ten-ball joint with circumferentially alternately arranged first and second balls 14, 15.

FIG. 5B shows the balls of an eight-ball joint with circumferentially alternately arranged first and second balls 14, 15.

FIG. 5C shows the balls of an eight-ball joint whose first and second balls 14, 15 are circumferentially alternately arranged in pairs, with alternately arranged pairs of first pairs of tracks 22, 23 and second pairs of tracks 24, 25 corresponding to same.

FIG. 5D shows the balls of a six-ball joint with circumferentially alternately distributed first and second balls 14, 15.

FIG. 5E shows the balls of a four-ball joint with circumferentially distributed first and second balls 14, 15.

The invention claimed is:

1. A constant velocity joint in the form of counter-track joint comprising:
   an outer joint part comprising a first longitudinal axis ($L_A$) as well as an attaching end and an aperture end which are positioned axially opposite one another, and first outer ball tracks and second outer ball tracks;
   an inner joint part comprising a second longitudinal axis ($L_I$) and an attaching mechanism for a shaft pointing towards the aperture end of the outer joint part, and first inner ball tracks and second inner ball tracks (25), wherein the first outer ball tracks and the first inner ball tracks form first pairs of tracks which receive first balls, and the second outer ball tracks and the second inner ball tracks form second pairs of tracks which receive second balls; and
   a ball cage positioned between the outer joint part and the inner joint part and comprising circumferentially distributed first cage windows each accommodating one of the first balls and second circumferentially distributed cage windows each accommodating one of the second balls,
   wherein, when the joint is in the aligned condition, the first pairs of tracks widen from the aperture end to the attaching end and, when the joint is in the aligned condition, the second pairs of tracks widen from the attaching end to the aperture end, and
   wherein the circumferential length (L1) of the first cage windows for the first balls in the first pairs of tracks is greater than the circumferential length (L2) of the second cage windows for the second balls in the second pairs of tracks.

2. A joint according to claim 1, wherein the first pairs of tracks and the second pairs of tracks are arranged so as to alternate across the circumference.

3. A joint according to claim 2 comprising a joint base with an attaching journal at the attaching end of the outer joint part.

4. A joint according to claim 2 comprising a flange face and a second aperture at the attaching end of the outer joint part.

5. A joint according to claim 2 wherein the joint comprises an even number of at least four balls.

6. A method of assembling a joint according to claim 2 comprising first, inserting the first balls one after the other through the first cage windows in the joint over-articulated by a first angle ($a_1$), and thereafter inserting the second balls one after the other through the second cage windows in the joint over-articulated by a second, smaller angle ($a_2$).

7. A joint according to claim 1, wherein pairs of first pairs of tracks and pairs of second pairs of tracks are arranged so as to alternate across the circumference.

8. A joint according to claim 7 comprising a joint base with an attaching journal at the attaching end of the outer joint part.

9. A joint according to claim 7 comprising a flange face and a second aperture at the attaching end of the outer joint part.

10. A joint according to claim 7, wherein the joint comprises an even number of at least four balls.

11. A method of assembling a joint according to claim 7 comprising first, inserting the first balls one after the other through the first cage windows in the joint over-articulated by a first angle ($a_1$), and thereafter inserting the second balls one after the other through the second cage windows in the joint over-articulated by a second, smaller angle ($a_2$).

12. A joint according to claim 1 comprising a joint base with an attaching journal at the attaching end of the outer joint part.

13. A joint according to claim 12, wherein the joint comprises an even number of at least four balls.

14. A method of assembling a joint according to claim 12 comprising first, inserting the first balls one after the other through the first cage windows in the joint over-articulated by a first angle ($a_1$), and thereafter inserting the second balls one after the other through the second cage windows in the joint over-articulated by a second, smaller angle ($a_2$).

15. A joint according to claim 1 comprising a flange face and a second aperture at the attaching end of the outer joint part.

16. A joint according to claim 15, wherein the joint comprises an even number of at least four balls.

17. A method of assembling a joint according to claim 15 comprising first, inserting the first balls one after the other through the first cage windows in the joint over-articulated by a first angle ($a_1$), and thereafter inserting the second balls one after the other through the second cage windows in the joint over-articulated by a second, smaller angle ($a_2$).

18. A joint according to claim 1, wherein the joint comprises an even number of at least four balls.

19. A method of assembling a joint according to claim 18 comprising first, inserting the first balls one after the other through the first cage windows in the joint over-articulated by a first angle ($a_1$), and thereafter inserting the second balls one after the other through the second cage windows in the joint over-articulated by a second, smaller angle ($a_2$).

20. A method of assembling a joint according to claim 1 comprising first, inserting the first balls one after the other through the first cage windows in the joint over-articulated by a first angle ($a_1$), and thereafter inserting the second balls one after the other through the second cage windows in the joint over-articulated by a second, smaller angle ($a_2$).

* * * * *